Figures 1, 2:
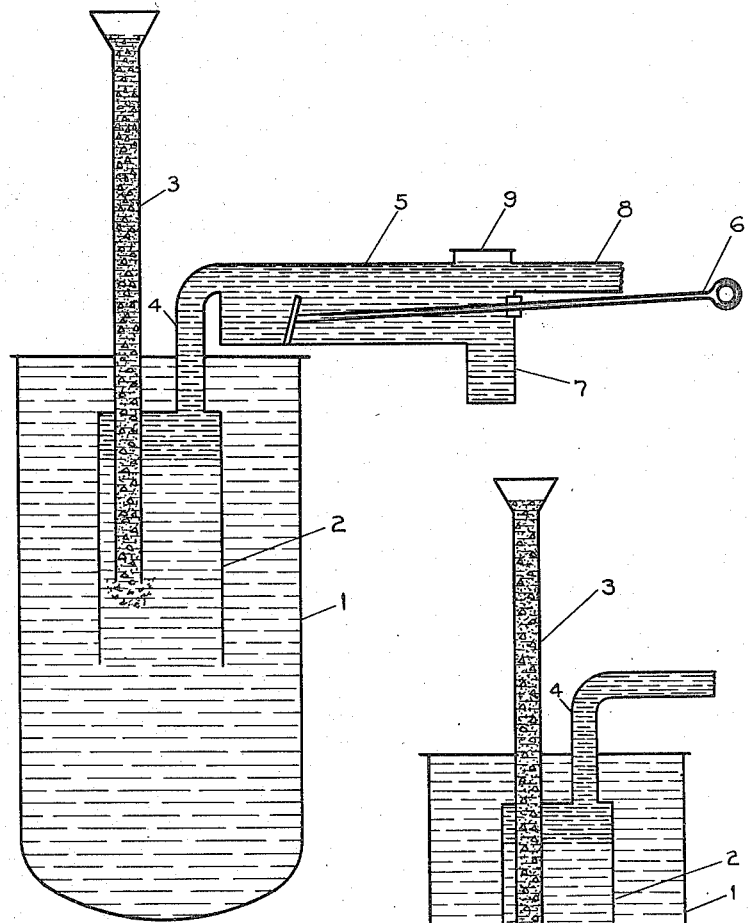

March 16, 1937. H. N. GILBERT 2,073,631
METAL RECOVERY
Original Filed Aug. 15, 1935

INVENTOR.
HARVEY N. GILBERT
BY *P. M. Paulson*
ATTORNEY

Patented Mar. 16, 1937

2,073,631

UNITED STATES PATENT OFFICE 2,073,631

METAL RECOVERY

Harvey N. Gilbert, Niagara Falls, N. Y., assignor to E. I. du Pont de Nemours & Company, Wilmington, Del., a corporation of Delaware Original application August 15, 1935, Serial No. 36,360. Divided and this application April 9, 1936, Serial No. 73,407

3 Claims. (Cl. 204—21)

This invention relates to the recovery of light metals from their salts or alloys and more particularly to the recovery of metal values from mixtures of light metals and non-metallic substances.

This application is a division of my co-pending application, Serial No. 36,360 filed August 15, 1935.

The term "light metals" is used herein to designate the alkali metals, i. e. sodium, potassium, lithium, etc., the alkaline earth metals, i. e. calcium, barium, strontium, and magnesium and beryllium. In the production of light metals by electrolysis of fused metal salts, the crude metal as obtained from the electrolytic cell usually contains a number of solid impurities, consisting mainly of metal salts and oxides. The crude metal is usually purified by mechanical separation of solid impurities, for instance by filtration of the molten metal. The residue obtained from such separation consists of a mixture of the separated solids suspended in or emulsified with more or less liquid metal. The amount of metal appearing in the residue may vary, depending upon the nature of the metal and the method of purification used, and in some cases may be as much as 90% by weight. The separation of any significant amount of metal from such residues heretofore has been exceedingly difficult; and a complete separation of metal from the non-metallic substances present has been heretofore impossible. If a partial separation be effected, for example by pressing, the final residue still contains considerable amounts of metal and if the metal is of the more reactive type, for instance sodium, the residue is hazardous to handle and dispose of because of the danger of fire if it should come in contact with water or atmospheric moisture. Such residues can be disposed of only by destroying the metal, by burning in a furnace or by other chemical means. When this is done, the resulting mixture of salts and oxides has no commercial value and must be wasted.

In some cases where a foreign salt is used to lower the melting point of the electrolyte in the production of a light metal by fused salt electrolysis, more or less of the corresponding foreign metal also appears in the crude metal removed from the cell. For example, in the production of sodium by electrolysis of fused sodium chloride, calcium chloride is added to the electrolyte with the result that the crude sodium contains small amounts of calcium. In cases where the foreign metal is of limited solubility in the metal being produced, it may be removed from the liquid mixture along with the non-metallic impurities by mechanical separation at a temperature below the freezing point of the foreign metal. In such cases, the residue obtained consists of considerable amounts of this foreign metal, mixed with the other salts and metals and oxides of one or both of the metals.

An object of this invention is to substantially completely recover metal values from the aforesaid residues obtained in the separation of solid impurities from electrolytic light metals. A further object is to effect such recovery in such manner that non-metallic by-products of commercial value will be obtained. A still further object is to provide an improved means for reacting a light metal mixture or alloy with a salt or salt mixture to produce a different metal or alloy. Other objects will be hereinafter apparent.

I have discovered that essentially complete separation of metal from mixtures of the nature of the aforesaid residues may be accomplished by introducing the residues into a separating bath at a temperature at which the metal to be recovered is liquid. The separating bath of my invention is a body of molten salt having a specific gravity materially higher than that of the metal. When such residues are added to the separating bath, the salts and oxides of the residues dissolve or settle out in the molten salt while the metal or metals rise to the surface thereof, and may be drawn off in the liquid state or otherwise removed, thus effecting a substantially complete separation of the metal from the non-metallic substances present. If it is desired merely to effect a mechanical separation of light metal from non-metals without changing the amount or nature of the metal or alloy originally present, the separating bath is made up of salts with which the metal residues will not react. On the other hand, the composition of the fused salt separating bath may be so selected that one or more metals present in the residue will react with one or more constituents of the fused salt separating bath to produce another metal or alloy, this reaction being effected simultaneously with the separation of the non-metallic constituents.

One modification of my invention comprises contacting a residue containing more than one metal with a fused salt or salt mixture which reacts with all but one of the metals, so that the metal or alloy finally removed from the system is substantially free from the undesired metal or metals or contains a smaller proportion of them than was present in the original mixture. For example, a residue containing two metals may be reacted with a salt of one of them. The metal whose salt is not originally present in the molten salt bath will react by double decomposition with the salt to release the metal of the salt in its stead, and the metal rising towards the surface of the salt bath will be substantially pure or will contain less of the metal which reacts with the salt of the separating bath than was originally present, depending upon circumstances more fully described below.

I am aware that heretofore it has been proposed to produce light metals or alloys thereof by reacting a light metal with a fused salt or salt mixture. However, in order to obtain light metals or alloys in good yields and of high degree of purity, it has been necessary heretofore to perform these operations under such temperature conditions that the metal or alloy formed by the reaction is distilled off as it is formed. Such methods require relatively high temperature and more or less complicated apparatus unsuited to economical, large scale production. Without such distillation procedure, these processes heretofore have not been adopted for recovery of light metals from their mixtures with non-metallic compounds or for the separation of a substantially pure light metal from mixtures or alloys of light metals.

My invention is not to be confused with these prior processes wherein a light metal is produced by reacting another metal with a light metal salt. My process comprises the recovery of light metal values from a mixture of light metal or metals with non-metallic substances wherein a complete separation of the desired metal or alloy is effected in the liquid phase and preferably in a continuous manner. In its preferred form, my process enables substantially the same degree of separation obtainable by distillation methods but employs lower temperatures and simpler apparatus.

The appended drawing illustrates diagrammatically two forms of apparatus which may be utilized to carry out my invention.

Fig. 1 shows in cross section a covered vessel 1 filled with a molten separating salt bath and heated by means not shown. Arranged within vessel 1 in such manner that it lies below the surface of the fused salt is a cylindrical, inverted bell 2. An inlet tube 3 passes through the cover of the vessel 1 and thence through the top of the bell 2 to a point near but above the open end of the bell. An outlet tube 4 leads from the top of the bell to the exterior of vessel 1.

The apparatus illustrated by Fig. 2 is identical with that illustrated by Fig. 1 as respects the vessel 1, the bell 2, the inlet tube 3 and the outlet tube 4, but has in addition a settling trap 5 connected to the outlet 4. Settling trap 5 is elongated in shape and has a downwardly extending member or sump 7 at the end opposite the connection to outlet 4. Scraping tool 6, which is inserted through the wall of trap 5 in such manner that it is capable of reciprocal motion and a certain angular displacement, is adapted to scrape solid material from the bottom of trap 5 into sump 7. An opening, closed by cover 9, is situated in trap 5 directly above the sump 7. Outlet pipe 8 serves to carry liquid metal from trap 5.

One method of carrying out my invention may be described by reference to Fig. 1. A residue consisting of a sludge-like mixture of molten light metal or metals and insoluble non-metallic substances, e. g. salts and oxides is introduced into the apparatus continuously through inlet 3. At the bottom of inlet 3, the residue comes into contact with molten salt, which dissolves certain of the non-metallic impurities; other impurities settle out, while metal substantially free from non-metallic substances collects in the upper portion of bell 2. Due to the difference between the specific gravities of the salt and the metal, the metal is forced upwards through outlet 4, where it may be collected in suitable containers, molds or the like. Preferably, the portion of the salt bath below bell 2 is lightly agitated, e. g. by a current of gas inert to the metal being recovered, so as to prevent large amounts of the insoluble solid material from settling out in the bottom of vessel 1; otherwise, there is a tendency for settled solids, which are heat insulators, to cause overheating of the bottom of the vessel. At intervals, accumulated solids may be allowed to settle out and then removed. The temperature of the molten bath, of course, must be above the melting points of the metals present and preferably is maintained at such point that the viscosity of the bath is relatively low, in order that gravity separation will readily occur. The required difference between the specific gravities of the salt bath and the metal depends somewhat on the construction of the apparatus; for instance, when this difference is small the height to which the outlet tube 4 rises above the salt bath level must be correspondingly shortened.

In some cases, as mentioned above, the residues entering the process will contain more than one free light metal. The method of handling such residues according to my invention where it is desired to obtain only one of the metals present, is illustrated by the following example:

*Example*

The process is carried out in the apparatus diagrammatically illustrated by Fig. 2 of the drawing. Vessel 1 is a covered steel cylindrical pot, for example, 10 feet deep by 4 feet in diameter. The bell 2 is 24 inches in diameter by 4 feet 6 inches long, the top of the bell being situated about 17 inches below the cover of vessel 1. Inlet 3 is a 4 inch iron pipe 6 feet 6 inches in length, extending to within 18 inches of the bottom of the bell 2. Settling trap 5 is a cylindrical vessel 16 inches in diameter by 7 feet 3 inches in length, the downwardly extending member 7 being 16 inches in diameter by about 12 inches in length.

Vessel 1 is mounted in a furnace heated by a gas flame and is filled to a point above the top of bell 2 with a fused, anhydrous mixture of calcium chloride and sodium chloride, containing between 60 and 75% by weight of sodium chloride. A filter residue, containing about 70% of metallic sodium, about 20% of metallic calcium, and about 10% of salts and oxides of these metals, is continuously fed into the apparatus by way of inlet 3, while the salt bath is mildly agitated by a stream of nitrogen introduced near the bottom of vessel 1 by means not shown. As the residue comes into contact with the molten salt, part of the non-metallic constituents dissolve in the bath, the remainder, which is chiefly calcium oxide, tends to settle in the lower portion of the bath; the calcium reacts with the salt bath as follows:

$$Ca + 2NaCl \rightarrow 2Na + CaCl_2$$

At the start of the operation, the temperature of the bath in vessel 1 is maintained at between 700° and 800° C.; later, as the sodium chloride content of the bath decreases, due to the reaction between calcium and sodium chloride, the melting point of the salt mixture is correspondingly lowered and the temperature may be reduced to around 600° C. During the process, samples of the molten bath are removed from vessel 1 from time to time and analyzed to determine the sodium chloride and calcium oxide contents. The sodium chloride content of the bath is maintained at not less than 30% by weight by withdrawing portions of the bath and replacing them by sodium chloride as necessary. When the calcium oxide content reaches 10-20% by weight, agitation is interrupted and when the oxide has settled out it is removed with a perforated ladle.

Liquid sodium, containing a small amount of metallic calcium, rises in the upper portion of bell 2 and thence passes through outlet tube 4 into trap 5. At the temperature at which the metal leaves bell 2, substantially all of any unreacted calcium present is dissolved in the outflowing sodium. Trap 5 is air-cooled, preferably by blowing a blast of air against the exterior surface, to cool the metal therein to a temperature of 100° to 175° C. Preferably, the temperature in trap 5 is maintained so that the temperature of the sodium leaving at exit pipe 8 is between 150° and 175°. At these temperatures, the calcium precipitates and settles out in the bottom of the trap. At regular intervals of time, for instance every fifteen minutes, the calcium settling out in the bottom of the trap is scraped into the sump 7 by means of the scraper 6. From time to time, the precipitated calcium is removed from sump 7 by a bailing device inserted into the apparatus by way of the opening closed by cover 9. The material thus removed consists of a mixture of sodium and calcium, containing a small amount of oxide, and may be recycled through the process by introducing it by way of inlet 3. The sodium issuing from the apparatus by way of outlet 8 is substantially free from oxide and/or salt and may be substantially free from calcium or may contain up to 1% of calcium, depending on how efficiently the process has been carried out. Samples of sodium obtained by this process from the above residue had the following compositions:

|  | Sample 1 | Sample 2 | Sample 3 |
| --- | --- | --- | --- |
|  | Percent | Percent | Percent |
| Sodium | 99.81 | 99.94 | 99.968 |
| Total Calcium (free and combined) as Ca | 0.18 | 0.05 | 0.026 |
| Chlorides, as Cl | 0.01 | 0.01 | 0.006 |

As stated above, in the electrolysis of fused salts, mixtures of salts rather than pure salts are often used to obtain an electrolyte having a sufficiently low melting point. According to a modification of my invention, a mixture of fused alkali and/or alkaline earth metal salts is electrolyzed and the crude metal thus obtained is purified by mechanically separating solid impurities from the liquid metal, e. g. by filtration. The residue obtained by the purification step, consisting of a mixture of metals and non-metallic substances is reacted with a fused salt according to the above described method in such manner that the desired metal, alloy or metal mixture is obtained. The salt mixture resulting from this reaction in the separating bath is used to replenish electrolyte in the electrolysis step. Thus the cycle is complete with only some alkaline earth oxides to be disposed of after removal from the separating bath.

The electrolysis of sodium chloride to produce substantially pure sodium is one example of this method of practising my invention. In this case, the electrolyte may consist of a mixture of sodium chloride and calcium chloride. The crude metal removed from the electrolytic cell contains varying amounts of metallic calcium and metal salts and oxides. The liquid crude metal is filtered at a temperature at which calcium is least soluble therein, to produce sodium having a purity of more than 99%. The filter residue consists of a mixture of sodium and calcium, together with around 10% of salts and oxides. This residue is introduced into a fused separating bath comprising calcium chloride and sodium chloride as described in the above example. The calcium reacts with the sodium chloride of the separating melt to produce calcium chloride and sodium, the non-metallic constituents of the residue are separated and the sodium originally present is recovered, together with that formed by the reaction, in a state of high purity. The calcium chloride produced by the reaction is recovered, for example, as a mixture of sodium chloride and 60-70% by weight of calcium chloride; this recovered salt mixture, together with more sodium chloride is used to replenish the electrolyte in the electrolytic cells. In this method of operation the calcium goes through a continuous cycle, in which it appears successively as calcium chloride and as the free metal. There is of course a certain loss of calcium, due chiefly to oxide formation; this small loss may be made up by adding fresh calcium chloride to the electrolytic cells as required.

This cyclic process affords a means of utilizing the calcium produced along with the sodium during electrolysis and has other advantages. Ordinarily, when it is desired to add calcium chloride to the fused electrolyte in the electrolytic production of sodium from sodium chloride, the calcium chloride first must be thoroughly dehydrated to prevent explosions due to the formation of steam within the molten electrolyte. The salt mixture recovered in the above described process contains from 60% to 70% calcium chloride, is substantially anhydrous and hence may be added to the electrolytic cell bath in lieu of pure calcium chloride. Furthermore, because of the presence of the relatively large amounts of sodium chloride, the mixture is less hygroscopic than pure calcium chloride; consequently, there is less danger of absorption of water by the calcium chloride before the mixture can be introduced into a cell bath than when pure calcium chloride is used.

Obviously, many variations of the above described process may be made without departing from the spirit and scope of my invention. For example, separation of the metal issuing from outlet 4 after cooling may be effected by means other than settling, for instance by filtration. Furthermore, my invention is not restricted to the continuous process illustrated above. For instance, filter residues or other mixtures of light metals or light metals and non-metallic substances may be mixed with a suitable molten separating salt and the mixture allowed to settle and cool in a mold out of contact with air or moisture. The resulting molded mass will consist essentially of a solidified metal layer and a salt layer which can be mechanically separated.

By varying the composition of the separating salt bath employed, the composition of the metal issuing from the process may be correspondingly varied. For example, by varying the calcium chloride content of the salt bath described in the above example, sodium-calcium alloys of various compositions may be produced. If it is desired to produce an alloy rich in calcium, the calcium chloride content of the bath is maintained at a high value, e. g. more than 70% by weight, whereupon the following reaction will occur:

$$2Na + CaCl_2 = Ca + 2NaCl.$$

The process advantageously can be used to recover a substantially pure light metal, from a mixture, not only by completing the separation in a settling trap or other mechanical means as illustrated by the above example, but by effecting a complete separation by means of reaction with the molten salt separating bath, utilizing a series of runs if necessary. For example, a mixture of sodium and calcium, either pure or contaminated with non-metallic substances, may be reacted with a salt mixture rich in a calcium salt to produce an alloy of sodium and calcium, the major portion of which is calcium. This alloy may be again reacted with a salt bath containing large amounts of calcium chloride and, if necessary, the process repeated a third time to produce calcium substantially free from sodium. In like manner, the process may be used to produce other metals and alloys having low melting points.

The temperature at which the process is carried out depends upon the respective melting points of the salts and metals involved in the process, and also to some extent upon the relative viscosity of the molten salts and metals at various temperatures above their melting point. That is, the metals and salts present must be sufficiently fluid at the operating temperature to permit effective gravity separation of the bath components.

Preferably the fused salt bath is maintained substantially free from water, especially if highly reactive metals such as sodium are present. However, small amounts of water may be present, provided the resulting hydrogen evolution is not excessive.

My process is useful and advantageous in many respects. It permits efficient, economical, and effective separation of light metals from each other or from non-metallic impurities, and effects such separations more efficiently and economically than has heretofore been possible. The process also is useful and efficient for the preparation of various alloys of the light metals from various light metal mixtures. An advantage of the process, as applied to the electrolytic preparation of light metals, is that it converts impurities in the crude product into a salt mixture suitable for partial replenishing of the electrolytic cell bath.

I claim:

1. A process for the production of a light metal comprising electrolyzing a molten mixture comprising a salt of said light metal and a salt of at least one other light metal having a limited solubility in the light metal to be produced, filtering the crude product of electrolysis to recover the desired light metal in substantially pure form, reacting the filtration residue with a fused salt separating bath comprising a salt of said desired metal, separating said desired metal from said bath and subjecting the resulting salt mixture, together with added salt of said desired metal, to fused salt electrolysis.

2. A process for the manufacture of a light metal comprising electrolyzing a molten mixture comprising a salt of the desired metal mixed with a salt of another light metal, filtering the desired metal from the crude product of electrolysis, reacting the filtration residue with a fused salt separating bath comprising a salt of said desired metal, separating said desired metal from said bath and subjecting the resulting salt mixture, together with added salt of said desired metal, to fused salt electrolysis.

3. A process for the manufacture of sodium comprising electrolyzing a molten salt mixture comprising sodium chloride and calcium chloride, filtering substantially pure sodium from the crude product of electrolysis, reacting the filtration residue with a fused salt separating bath comprising calcium chloride and not less than 30% by weight of sodium chloride, separating substantially pure sodium from said bath and subjecting the resulting salt mixture, together with added sodium chloride, to fused salt electrolysis.

HARVEY N. GILBERT.